United States Patent Office 3,553,296
Patented Jan. 5, 1971

3,553,296
ODOR RETAINING POLYOLEFIN COMPOSITION AND PROCESS FOR PREPARING THE SAME
Bruno Lothar Gaeckel, Westmount, Quebec, Canada, (123 Eglinton Ave. E., Toronto 12, Ontario, Canada)
No Drawing. Filed Mar. 17, 1969, Ser. No. 807,928
Int. Cl. C08f 29/12
U.S. Cl. 260—897                                            12 Claims

ABSTRACT OF THE DISCLOSURE

A polyolefin composition having improved odor retaining properties is prepared by blending polyethylene particles of a size of from 150 to 350 mesh with an odoriferous oil and then mixing the blend with the polyolefin in an amount of from 0.2 to 2.0 percent by weight:

---

This invention relates to a scented polyolefin composition having improved odor retaining properties. More particularly it relates to a polyolefin composition containing polyolefin blended with an odoriferous oil such as perfumes or animal repellants and to a process for preparing such compositions.

Scented polyolefin such as low density polyethylene containing a perfume has become increasingly useful in recent years as new applications are found for polyolefins as replacement for other materials. For example low density polyethylene is now used to a great extent in the manufacture of artificial flowers. Such flowers were previously made of paper but polyethylene flowers are usually more life-like, have greater color retention and have a longer life span. It is desirable that a perfume imitative of the odor of the natural flower be manufactured into the polyethylene flower so that the odor therefrom could be retained over prolonged periods.

Another use for scented low-density polyethylene is in the manufacture of polyethylene bottles and containers used in the cosmetic industry. If this feature could be added to cosmetic containers and retained in the container over prolonged periods of shelf life, polyethylene would have an additional sales appeal over glass containers.

Another desirable use for polyolefins having odors which can be retained over long periods is in the garbage bag industry. Garbage bags of low density polyethylene which contain a perfume would mask the odor of the polyethylene bag or its contents. In another embodiment the scented polyethylene garbage bags could contain an odor which is repugnant to rats, dogs or other animals and thereby act as a repellant when the filled bag is on the street awaiting pick-up.

Various attempts have been made in the prior art to prepare low density polyolefin containing perfume. For example the perfume was added to the polyethylene in relatively high concentrations by mixing in a Banbury mixer. In other cases the polyolefin was simply sprayed with a perfume mixed in a solvent which is compatible with polyolefin. In these attempts however the polyolefin had poor odor retention and was of little practical use over the average shelf life periods of the commercial market.

It is therefore an object of this invention to provide a scented polyolefin which has improved odor retention properties.

It is another object of this invention to provide a process of preparing a scented polyolefin composition which is capable of retaining its odor over a relatively long period.

These objects are obtained by providing a composition which comprises: polyolefin mixed with from 0.2 to 2.0 percent by weight of a polyethylene blend based on the weight of said polyolefin, said polyethylene blend consisting of polyethylene particles of a size from 150 to 350 mesh blended with from 5 to 50 percent by weight of an odoriferous oil based on the weight of said polyethylene.

These objects are also obtained by a process which comprises: (a) blending polyethylene particles of a size of from 150 to 350 mesh with from 5 to 50 percent by weight of an odoriferous oil based on the weight of said polyethylene; (b) mixing the blended polyethylene with polyolefin in an amount of from 0.2 to 2.0 percent by weight of said polyolefin.

By blending the odoriferous oil with particles of polyethylene having a particle size of from 150 to 350 mesh, a blend is obtained which when added to the polyolefin will retain the odor for longer periods than was previously possible.

By "odoriferous oil" is meant natural and synthetic perfumes, essential oils and other odorous material including those which are repugnant to various animals provided such oil is compatible with a paraffin oil without rapid sweat out.

Particularly suitable odoriferous oils for use in this invention are: oil of lilac, oil of honeysuckle, attar of roses, oil of pepperpink and oil of carnation.

It was found that desirable odor retention was obtained when the odoriferous oil was blended with polyethylene having a particle size of from 150 to 350 mesh. The particularly good odor retention properties of the present composition is believed to be due to the initial blending of the polyethylene in particle form, within the stated particle size, with the odoriferous oil prior to mixing with the main polyolefin component of the composition. Low and medium density polyethylene particles ground to a 150 to 350 mesh particle size can be used in the initial blend but high density polyethylene was found to be particularly suitable. High density polyethylene such as that produced according to Canadian Pat. 722,787 of Robert M. Manyik et al. yields particles of product within the mesh size and can therefore be used in the blend without further grinding. Particularly preferred particles are those having a mesh size of about 200.

The range of odoriferous oil in the high density polyethylene can be from 5 to 50 percent by weight with a preferred range of from 30 to 40 percent by weight. It is impractical to blend amounts greater than 50 percent by weight of the odoriferous oil since these effect the physical characteristics of the polyethylene and ultimately effect the total composition. A lower limit of 5 percent is the most practical for most perfumes and essential oil but this range can vary depending upon the strength of the odoriferous oil used and the desired strength of the odor of the final product.

The blended polyethylene is then mixed with polyolefin in an amount of from 0.2 to 2.0 percent by weight based on the weight of said polyolefin. While concentrations above 2.0 percent can be used this upper limit is satisfactory for providing the desirable odor strength of most odoriferous oils, compositions containing much higher concentrations of polyethylene might have a detrimental effect on the physical properties of the polyolefin, e.g. in moulding containers if the polyethylene is the high density type and the polyolefin is low or medium density.

Although the blend of high density polyethylene and odoriferous oil is particularly suitable for mixing with low density olefins since these have poor odor retention characteristics in themselves, they can also be mixed with high density polyolefins and with any thermoplastic material that is compatible with high density polyethylene.

EXAMPLE I

The ease of incorporating five different perfumes in high density polyethylene powders of different particle size distributions was determined. The five perfumes which were used comprised the following essential oils in a volatile solvent containing a perfume-fixative:

(1) Oil of lilac,
(2) Oil of honeysuckle,
(3) Attar of roses,
(4) Oil of pepperpink, and
(5) Oil of carnation.

The perfumes which were used are those commercially available from Descollonges Inc., 160 5th Ave., New York, N.Y., U.S.A. under the following trade names respectively:

(1) Lilas,
(2) Honeysuckle Florafix,
(3) Rose Cramoisie PY15,
(4) Oeillet Poivre, PY15, and
(5) Carnation Florafix.

These perfumes were mixed with a high density grade of polyethylene powder (density 0.9600 g./cc.) in a tumble blender using steel balls to prevent the formation of lumps during the blending.

The resulting blends were then mixed in a 1% by weight concentration in polyethylene of density 0.9200 g./cc. The blending characteristics of various concentrations of the perfume in percent by weight in the high density polyethylene are shown in Tables I to III for different polyethylene particle sizes. These blending characteristics are given in terms based on the subjective evaluation of the applicant. "Good" in terms of mixing and adsorption was given to mixes having even dispersion in polyethylene which is substantially free of lumps. "Good" in terms of pourability was given to mixes having a substantially constant viscosity. The column showing the degree of detection of perfume over a given storage period is based on a composition consisting of a mixture of 1% by weight of the corresponding perfume blend in low density polyethylene (d.: 0.9200 gm./cc.).

TABLE I

Perfume blended with high density polyethylene (d.: 0.9600 gm./cc.) particles that are substantially completely retained by a 20 mesh sieve.

| Perfume concentration in percent by weight of polyethylene | Mixing | Pourability | Absorption of perfume | Detection of perfume in total composition |
|---|---|---|---|---|
| 5 | Good | Fair | Good | None after 30 days. |
| 10 | do | do | do | Slight after 30 days. |
| 20 | do | do | Poor | None after 30 days. |
| 30 | do | Good | do | Do. |
| 40 | do | do | Very poor | Slight after 30 days. |

TABLE II

Perfume blended with high density polyethylene particles that pass through a 20 mesh sieve but are substantially completely retained in a 50 mesh sieve.

| Perfume concentration in percent by weight of polyethylene | Mixing | Pourability | Absorption of perfume | Detection of perfume in total composition |
|---|---|---|---|---|
| 5 | Good | Fair | Good | None after 30 days. |
| 10 | do | do | do | Slight after 30 days. |
| 30 | do | Good | do | Do. |
| 40 | do | do | do | Do. |

TABLE III

Perfume blended with high density polyethylene particles that pass through a 250 mesh but are substantially completely retained by a 350 mesh sieve.

| Perfume concentration in percent by weight of polyethylene | Mixing | Pourability | Absorption of perfume | Detection of perfume in total composition |
|---|---|---|---|---|
| 5 | Good | Fair | Good | Slight after 6 months. |
| 10 | do | do | do | Do. |
| 20 | do | Good | do | Good after 6 months. |
| 30 | do | do | do | Do. |
| 40 | do | do | do | Strong after 6 months. |
| 60 | do | do | do | Do. |

From the results of Tables I and II, it will be seen that with the coarser grades of polyethylene powder, it was not possible to retain the perfume odor long even at the higher concentrations. For instance, in the case of the polyethylene powder of Table I, there was only slight extrusion of perfume after thirty days' storage even when the perfume was incorporated in the blend to an extent as high as 40% by weight based on the total weight of the resulting blend. Similarly, in the case of the medium coarseness grade of high density polyethylene powder of Table II, there was slight extrusion of perfume after thirty days' storage at the 40% by weight incorporation level.

By way of contrast, in the case of the fine polyethylene powder for which the results are given in Table III, it will be seen that, even at the relatively low level of 5% by weight perfume, there were detectable traces of the perfume after 6 months' storage.

EXAMPLE II

The blend containing 30% by weight of the oil of honeysuckle perfume in the fine polyethylene powder of Table III of Example I was mixed with a low density grade of polyethylene powder (density 0.9200 g./cc.) in the proportion of 1% of the blend based on the total weight of the resulting mixture. Test plates of 0.075 inch thickness were formed by injection moulding from the mixture. The perfume concentration in the test plates was 0.33% by weight.

The plates then were stored for 12 months at a temperature of about 23° C. and at a relative humidity of 50% and, after such storage, they retained a slight trace of the odor of honeysuckle.

Similar results were obtained after storage of test plates perfumed by the incorporation of polyethylene blends containing the lilac, carnation, pepperpink and rose perfumes. Artificial flowers moulded from the mixtures of the high density polyethylene blends with the low density polyethylene also showed satisfactory odor-retention after a similar 12 months' storage.

I claim:
1. A process for preparing a scented polyolefin having improved odor retention properties which comprises:
   (a) blending polyethylene particles of a size of from 150 to 350 mesh with from 5 to 50 percent by weight of an odoriferous oil based on the weight of said polyethylene,
   (b) mixing the blended polyethylene with polyolefin in an amount of from 0.2 to 2.0 percent by weight of said polyolefin.
2. A process as claimed in claim 1 wherein said polyolefin is one selected from the group consisting of polyethylene and polypropylene.
3. A process as claimed in claim 2 wherein said polyethylene particles have a density of from 0.9400 to 0.9700 g./cc.
4. A process as claimed in claim 3 wherein said polyethylene particles are blended with from 30 to 40 percent by weight of said odoriferous oil based on the weight of said polyethylene.
5. A process as claimed in claim 3 wherein said polyethylene particles are of a size of from 250 to 350 mesh and are blended with approximately 30 percent by weight of said odoriferous oil based on the weight of said polyethylene.

6. A process as claimed in claim 4 wherein said polyolefin is polyethylene having a density of from 0.9100 to 0.9400 g./cc.

7. A scented polyolefin composition having improved odor retention properties which comprises: polyolefin mixed with from 0.2 to 2.0 percent by weight of a polyethylene blend based on the weight of said polyolefin, said polyethylene blend consisting of polyethylene particles of a size of from 150 to 350 mesh blended with from 5 to 50 percent by weight of an odoriferous oil based on the weight of said polyethylene.

8. A composition as claimed in claim 7 wherein said polyolefin is one selected from the group consisting of polyethylene and polypropylene.

9. A composition as claimed in claim 8 wherein said polyethylene particles have a density of from 0.9400 to 0.9700 g./cc.

10. A composition as claimed in claim 9 wherein said polyethylene blend consists of said polyethylene particles blended with from 30 to 40 percent by weight of said odoriferous oil based on the weight of said polyethylene.

11. A composition as claimed in claim 9 wherein said polyethylene blend consists of said polyethylene particles of a size of from 250 to 350 mesh blended with approximately 30 percent by weight of said odoriferous oil based on the weight of said polyethylene.

12. A composition as claimed in claim 11 wherein said polyolefin is polyethylene having a density of from 0.9100 to 0.9400 g./cc.

References Cited

UNITED STATES PATENTS

| 3,445,394 | 5/1969 | Hunt | 252—66 |
| 3,287,309 | 11/1966 | Basdekis et al. | 260—34.2 |
| 2,169,055 | 3/1937 | Overshiner | 167—94 |

OTHER REFERENCES

Bassiti—Chem. Abstract, vol. 52, p. 5,873e.

SAMUEL H. BLECH, Primary Examiner

C. J. SECCURO, Assistant Examiner

U.S. Cl. X.R.

161—30; 252—522; 260—29.1